UNITED STATES PATENT OFFICE.

PATRICK W. KIERNAN, OF LOWELL, MASSACHUSETTS, ASSIGNOR TO LOWELL BLEACHERY, OF LOWELL, MASSACHUSETTS, A CORPORATION OF MASSACHUSETTS.

WATERPROOF COMPOSITION AND METHOD OF MAKING THE SAME.

1,327,239.  Specification of Letters Patent.  Patented Jan. 6, 1920.

No Drawing.   Application filed July 25, 1918.   Serial No. 246,686.

*To all whom it may concern:*

Be it known that I, PATRICK W. KIERNAN, a citizen of the United States, residing at Lowell, in the county of Middlesex and State of Massachusetts, have invented certain new and useful Improvements in Waterproof Composition and Methods of Making the Same; and I do hereby declare the following to be a full, clear, and exact description of the invention, such as will enable others skilled in the art to which it appertains to make and use the same.

The present invention relates to a water proof composition and method of making the same. The object of the invention is to produce an improved water proof composition of a paraffin base of such a character that the paraffin is prevented from solidification for an indefinite period of time.

The invention consists in the water proof composition and method of making the same hereinafter described and particularly defined in the claims.

According to the present invention, 810 pounds of paraffin, 112 pounds of stearic acid, and 125 pounds of petrolatum are placed in a vessel with about 100 gallons of water. Steam is admitted to the vessel for the purpose of heating the contents, and the whole is agitated and stirred until the solids are emulsified in the water. The temperature at which this operation is performed should be about 160° F.

27 pounds of soda-ash is dissolved in a separate vessel in lukewarm water to make a soda-ash solution. The temperature of the first vessel containing the paraffin, stearic acid and petrolatum emulsion is now reduced to about 130° F., and then maintaining the temperature at 130° F., and continuing the stirring or agitation of the mixture, the soda-ash solution is slowly added to the emulsion. From 20 to 30 minutes should be occupied in stirring the soda-ash solution into the emulsion. If the soda-ash solution be added too quickly, or when the emulsion is too hot, an objectionable tendency to the violent evolution of carbon dioxid occurs.

In continuing the stirring and allowing for the condensation of steam in the emulsion enough additional water should be introduced to bring the quantity up from 400 to 450 gallons. This paraffining mixture or emulsion will keep an indefinite length of time. When it cools to room temperatures it assumes a quasi-solid condition somewhat similar to that of soft soap. This paraffining emulsion will be used in paraffining textile fabrics by placing it in a steam-jacketed kettle, and raising its temperature by means of a steam jacket up to about 120° to 130° F. The cloth, if in piece form, will be drawn slowly through a bath of the paraffin emulsion and then passed between rollers to remove any excess of the material with which the fabric is impregnated. One of these rollers will be steam heated.

More or less of the paraffin, stearic acid and petrolatum may be used in preparing the emulsified paraffin. When a larger proportion of petrolatum is used the cloth paraffined by the mixture will be more flexible, and when less petrolatum is used the cloth will be stiffer.

Equivalents of the paraffin, stearic acid and petrolatum may be employed, but these substances are the substances to be preferred, because the best results are apparently obtained with them. In mixing the paraffin, stearic acid and petrolatum with water, the temperature of the mixture may be secured by the use of a steam jacketed kettle or otherwise, instead of by turning steam into the mixture, but the direct introduction of steam into the mixture is preferred, because it not only serves to heat the mixture, but also contributes to its agitation. Care must be exercised in preventing the temperature from rising above 160° F. The breaking down of the ingredients is liable to occur at higher temperatures.

The exact action of the substances upon each other is not precisely known, but it is believed that the soda-ash combines with the stearic acid to form a soap which contributes to the penetration of the fabric by the emulsified paraffin.

One feature of the specific compound hereinabove described of great importance, and which contributes to the economy of the method, resides in the fact that the mixture, once prepared, may be kept for an indefinite length of time, without solidification of the paraffin contents.

Having thus described the invention, what is claimed is:—

1. A water proof composition consisting of an emulsion of 810 parts of paraffin, 125 parts of petrolatum, the reaction products of 112 parts of a fatty acid and 27 parts of soda ash, and water.

2. The method of making a water proof composition which consists in preparing an emulsion of paraffin, petrolatum, fatty acid, and water at 160° F., cooling the mixture to 130° F. adding a solution of soda ash and agitating the mass.

PATRICK W. KIERNAN.